United States Patent
Jones et al.

(10) Patent No.: US 12,103,710 B1
(45) Date of Patent: Oct. 1, 2024

(54) FLIGHT CONTROL SURFACE MAINTENANCE STAND

(71) Applicant: Gov of the US as rep by the Secy of the Air Force, Wright Patterson AFB, OH (US)

(72) Inventors: Tanner Jones, Edmond, OK (US); Gabriel Myers, Midwest City, OK (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 18/341,459

(22) Filed: Jun. 26, 2023

(51) Int. Cl.
*B64F 5/40* (2017.01)
*F16M 13/02* (2006.01)

(52) U.S. Cl.
CPC ............... *B64F 5/40* (2017.01); *F16M 13/02* (2013.01)

(58) Field of Classification Search
CPC ..... B64F 5/40; B64F 5/10; B66F 7/28; F16M 13/02
USPC ........................................................ 248/317
See application file for complete search history.

(56) References Cited

U.S. PATENT DOCUMENTS

| | | | |
|---|---|---|---|
| 1,614,697 A | 1/1927 | Snook | |
| 2,016,525 A | 1/1938 | Henry | |
| 3,826,196 A | 7/1974 | Wallace | |
| 3,931,956 A | 1/1976 | Hawkins | |
| 4,133,514 A | 1/1979 | Anderson | |
| 4,145,006 A | 3/1979 | Webb | |
| 4,894,903 A | 1/1990 | Woods | |
| 4,995,146 A | 2/1991 | Woods | |
| 6,575,685 B2* | 6/2003 | Baxter, Sr. | E04G 21/166 414/609 |
| 7,246,790 B1 | 7/2007 | Francoeur | |
| 8,230,612 B1* | 7/2012 | Williams | G01B 5/0025 33/533 |
| 10,737,921 B2* | 8/2020 | Motley | B66C 19/00 |
| 10,982,805 B2* | 4/2021 | Burton | F16M 11/24 |
| 11,479,371 B1* | 10/2022 | Perry | B64C 9/00 |
| 2018/0319008 A1 | 11/2018 | Cook | |

* cited by examiner

*Primary Examiner* — Todd M Epps
(74) *Attorney, Agent, or Firm* — AFMCLO/JAZ; Larry L. Huston

(57) ABSTRACT

A stand for holding a flight control surface of an aircraft wing. The stand has a longitudinal spine supported by plural uprights and supporting at least two hanger assemblies. Each hanger assembly has attachment points transversely outboard of the spine. Rods articulably depend downwardly from the respective attachment points to be articulably connected at a cradle. The cradle is configured to fixedly hold an aircraft flight control surface for maintenance. By adjusting the transverse spacing of the rods from the spine, the attitude of the flight control surface can be adjusted as needed for a particular maintenance task.

20 Claims, 6 Drawing Sheets

FLIGHT CONTROL SURFACE MAINTENANCE STAND

STATEMENT OF GOVERNMENT INTEREST

The invention described and claimed herein may be manufactured, licensed and used by and for the Government of the United States of America for all government purposes without the payment of any royalty.

FIELD OF THE INVENTION

The present invention is related to a stand for holding a flight control surface of a fixed wing aircraft during maintenance and more particularly to such a stand that can stably hold the flight control surface in various static orientations as dictated by maintenance needs.

BACKGROUND OF THE INVENTION

In 1946 the Air Force set forth a requirement for an aircraft having unrefueled range of 8000 miles with a 10,000 pound bomb load and a top speed of 450 mph. That year a preliminary design contract was awarded to the Boeing Company. Initially, both Boeing and the Air Force envisioned this aircraft to be a second generation intercontinental bomber as a turboprop. Boeing won a contract for the aircraft with essentially a B-29 scaled up to B-36 size with straight wings and six turboprop engines. By 1948, a number of refinements had been made, including using eight Pratt and Whitney jet engines and swept wings with a new design to include a tapered wing being wide at the root and having an enlarged wing area compared to prior designs.

The first B-52, rolled out on 29 Nov. 1951, and the first flight, by the second B-52 to be built, was on 15 Apr. 1952. The initial production aircraft, the B-52A, was delivered to the Air Force in June 1954. The B-52H has a wingspan of 185 feet, a length of 157 feet and gross weight of 488,000 pounds. The B52 aircraft have six to seven spoilers usable asymmetrically to help the ailerons with roll control, or symmetrically to act as airbrakes, eliminating the need for a secondary deceleration parachute. Clearly, the flight control surfaces are critical to proper and continuing operation of the B-52 aircraft.

The second generation B-52G made its first flight on 31 Aug. 1958. The second generation eliminated fuel bladders in favor of a sealed wing structure, added more than 10,000 gallons of internal fuel capacity and retained the manual fuel trim operated by the copilot. A total of 744 B-52s were produced in Seattle, Washington and Wichita, Kansas plants between 1952 and 1962. On 26 Oct. 2022, Boeing marked 60 years since it delivered its last, and youngest, B-52 Stratofortress to the U.S. Air Force. Modern engineering analyses indicates the expected lifespan of the B-52 extends beyond 2040 and possibly for 100 years.

The B-52 is powered by eight engines, each providing 17000 pounds of thrust. The engines are fitted into four pods, two engines to a pod, suspended on pylons below and forward of the wing. The inboard pods are 10.4 meters (34 feet 2 inches) from the centerline and the outboard pods are 18.29 meters (60 feet) from the centerline.

A factor common throughout all B52 aircraft is the need to maintain and restore the flight control surfaces of the wings. Each wing has a length of almost 161 feet, an area of 4000 square feet, a taper ratio of 0.37 and a leading edge sweep of 35 degrees. The flight control surfaces are critical aerodynamic portions of the wings which allow the pilot to adjust and control the aircraft pitch during flight.

Since initial production in 1952 for maintenance and restoration, the flight control surface is removed from the aircraft and held by a stand. When positioned on the stand, the flight control surface may be cleaned, degreased, repainted, etc. But proper maintenance and restoration require the flight control surface be held stable in various orientations relative to the floor. A first flight control surface may be best treated by being held at a first angle, a second flight control surface may be best treated by being held at a second angle and yet a third flight control surface may be best treated by being held stable at multiple angles during maintenance and restoration.

But prior art stands hold the flight control surface in a single, fixed position with the leading edge upwards, jeopardizing stability. This arrangement suffers from the disadvantages of being unstable with the heavier edge of the flight control surface above the center of gravity and not providing for the flight control surface to be held at the optimum angle during various maintenance procedures. Clearly, a better approach is needed. More particularly a stand is needed which allows for convenient adjust during maintenance and restoration and hold the flight control surface with the heavy leading edge below the center of gravity.

SUMMARY OF THE INVENTION

The invention comprises a stand for holding a flight control surface of an aircraft wing in a static position. The stand has a longitudinal axis and a transverse direction perpendicular thereto. The stand comprises a frame and at least two spaced apart hanger assemblies joined thereto. The frame comprises a longitudinally oriented spine supported above the floor by a plurality of spaced apart uprights, so that a person can perform restoration and maintenance of the flight control surface. Each hanger assembly comprises a transversely oriented cradle for statically holding a flight control surface of an aircraft upwardly therefrom. The transversely oriented cradle is articulaby joined to respective distal ends of first and second mutually opposed rods, the mutually opposed rods being articulably connected to and depending downwardly from respective proximal ends connected to the spine. Each of the two mutually opposed rods is transversely adjustable towards and transversely adjustable away from the spine independent of the other mutually opposed tension rod to thereby affect the orientation of the flight control surface.

DETAILED DESCRIPTION OF THE INVENTION

Figure 1:
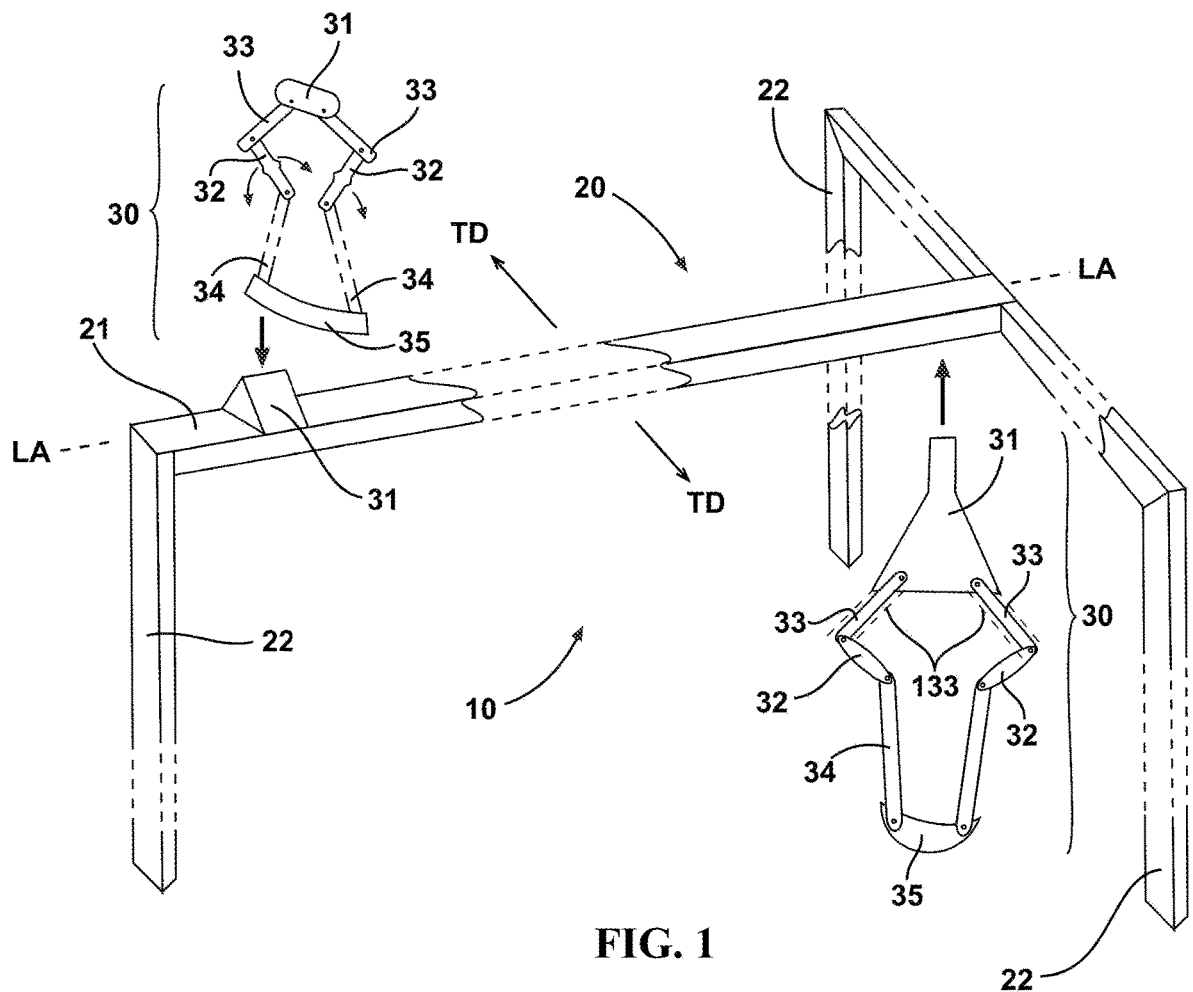
FIG. 1 is a partially exploded schematic perspective view of a stand according to the present invention having an upstanding hanger assembly on the left side thereof and a depending hanger assembly on the right side thereof.

Referring to FIG. 1, in a first embodiment a stand 10 according to the present invention comprises a frame 20 and a plurality of hanger assemblies. The frame 20 comprises a plurality of spaced apart uprights 22 joined by a spine 21. Each hanger assembly 30 is fixedly or movably mounted to the spine 21. Each hanger assembly 30 has a stanchion 31 upstanding from or depending from the spine 21 and a pair of pivot arms 32 articulaby joined thereto, a pair of control arms 33 articulaby joined thereto, the respective pivot arm 32 and control arm 33 being articulably joined at variable positions along the lengths thereof. A tension rod 34 depends downwardly from each pivot arm. The pivot arms 32 are joined underneath the spine 21 at a cradle 35. The cradle 35 is configured to hold the flight control surface 50 in the desired position during maintenance.

Examining the frame 20 in more detail, the spine 21 may be generally horizontal and defines the longitudinal axis LA of the stand 10. A transverse direction TD is perpendicular to the longitudinal axis LA and parallel to the floor. The stand 10 has longitudinally spaced apart uprights 22. At least two uprights 22 straddle the longitudinal axis LA for transverse stability. For example, one end of the stand 10 may have an A-shape configuration or inverted-U configuration, with two uprights 22. The other end of the stand 10 may have a single upright 22 coincident and generally orthogonal to the spine 21. Alternatively the stand 10 may have matched or dissimilar pairs of uprights 22 juxtaposed with the longitudinally opposed ends of the spine 21. The uprights 22 may have braces 26 as are known in the art for stability. The bottoms of the uprights 22 may have optional castors 27 for mobility. The stand 10 may be made of 304 SS for resistance to chemicals used during maintenance and restoration.

The spine 21 may comprise an I-beam as is known in the art, stacked bar stock or any configuration suitable for supporting the stanchions 31 of the hanger assemblies. The spine 21 preferably provides for longitudinal placement of the hanger assemblies as needed for a particular flight control surface 50, and then stably holding the hanger assemblies in place during maintenance and restoration.

Figure 2:
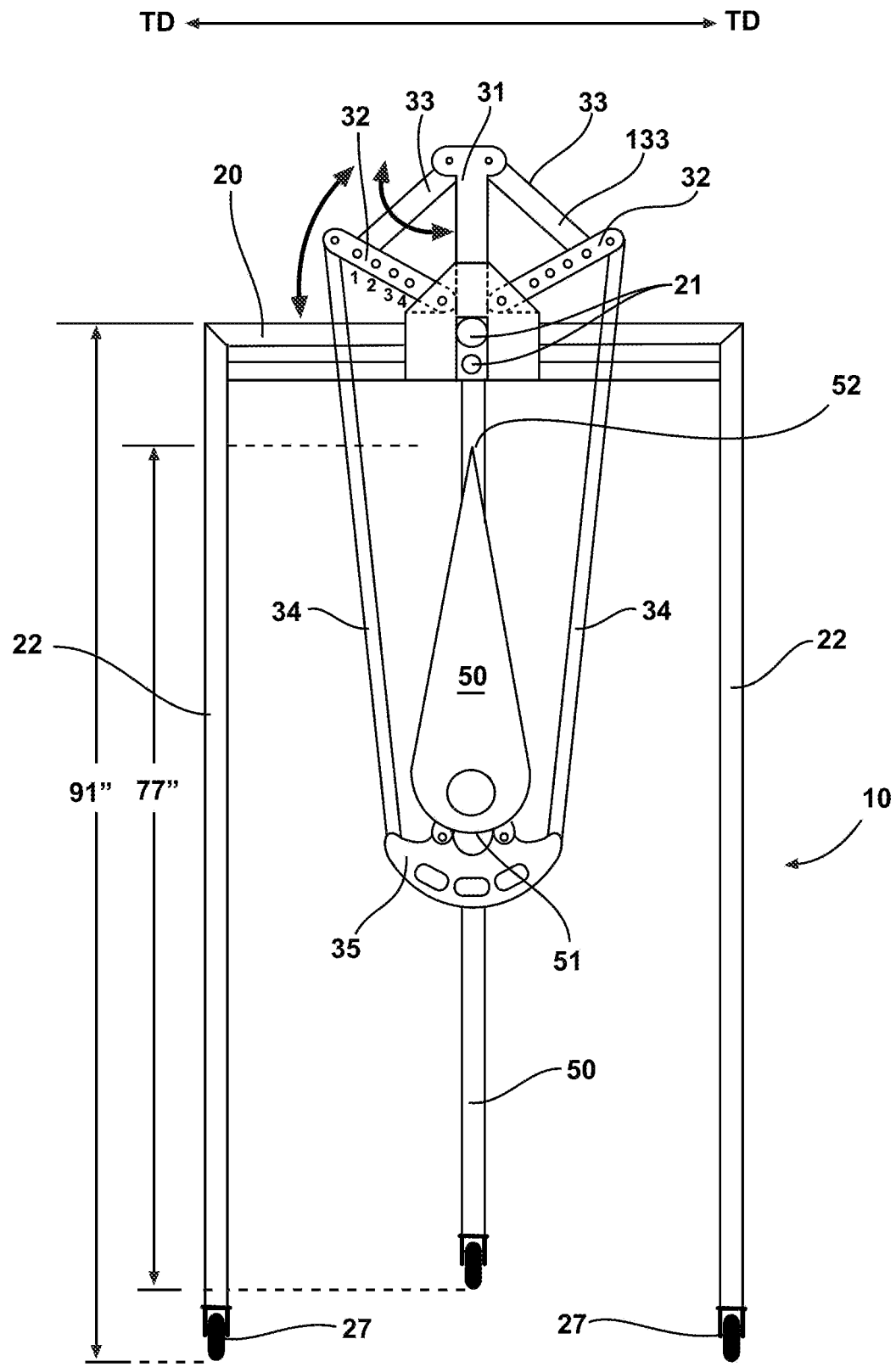
FIG. 2 is a side elevational view of a stand according to the present invention.

Referring to FIG. 2 and examining the plural hanger assemblies in more detail, the hanger assemblies may be identical for simplicity of construction or may be dissimilar for tailoring to specific geometries of the flight control surface 50. The hanger assembly 30, except for the cradle 35, is preferably symmetric about the longitudinal axis LA for balance and ease of construction.

The plural hanger assemblies may be upstanding from the spine 21 or may be depending from the spine 21. It being understood that one of skill would either use plural upstanding or plural depending hanger assemblies, and would not use both in the same stand 10. The upstanding and depending hanger assemblies are generally functionally identical in operation and functionality. The upstanding stanchion 31 hanger assembly 30 has the benefit that all legs of the frame 20 may be shorter, conserving materials. The depending stanchion 31 hanger assembly 30 has the benefit that the center of gravity may be lower, improving stability.

The hanger assembly 30 comprises a stanchion 31 which joins the rest of the hanger assembly 30 to the spine 21. The stanchion 31 may be longitudinally slidable along the length of the spine 21 or may be in fixed relationship with the spine 21. The stanchion 31 is not rotatable about the longitudinal axis LA or the vertical.

The stanchion 31 has at least four pivot points for articulable rotation of the pivot arms 32 and control arms 33. The pivot points are disposed in pairs with one pair for articulable attachment of the pivot arms 32 thereto and one pair for articulable attachment of the control arms 33 thereto. The pair of pivot points for the control arms 33 is preferably disposed above the pair of attachment points for the pivot arms 32. The cradle 35 further has attachment points for joining the flight control surface 50 in fixed relationship thereto. All of the aforementioned components, with the possible exception of the cradle 35, are preferably symmetric about the spine 21 and longitudinal axis LA.

The pivot arms 32 may be slotted or have spaced discrete through holes along the length thereof. The control arms 33 and tension rods 34 may be attached to the pivot arms 32 at appropriate positions along the length thereof. Preferably the tension rods 34 attach to the pivot arms 32 outboard of the control arms 33.

The control arms 33 are attached to the stanchion 31 at one distal end thereof and to the pivot arms 32 at the other distal end thereof. The specific attachment position to the pivot arms 32 may be adjusted as deemed necessary. The control arms 33 may be spring 133 biased, particularly with compression springs 133, for preload. The spring 133 bias minimizes vibration of the flight control surface 50 during maintenance and restoration. The control arm 33 may be inserted though a compression spring 133 so that preload occurs without additional steps being required when the control arm 33 is attached to the stanchion 31 and pivot arm.

While fixed pivot points of the pivot arms 32 and control arms 33 to the stanchion 31 are shown, one of skill will recognize the invention is not so limited. The hanger assembly 30 may have plural attachment points for articulably joining the distal ends of the pivot arms 32 and/or control arms 33 thereto.

The tension rods 34 are mutually opposed relative to the longitudinal axis LA. The tension rods 34 depend from proximal ends articulably joined to the respective pivot arms 32 to respective distal ends articulably joined to the cradle 35 on opposite sides of the longitudinal axis LA. While the tension rods 34 are shown to be fixed length, one of skill will recognize the invention is not so limited. The tension rods 34 may be variable length, as helpful to accommodate various flight control surfaces. The tension rods 34 may be attached to any suitable position on the pivot arm. In an alternative embodiment, prophetically the tension rods 34 may be attached to and depend from the control arms 33 instead of the pivot arms 32. Below the spine 21 the tension rods 34 are articulably joined to the cradle 35.

By adjusting the relative positions of the proximate ends of the tension rods 34 with respect to the longitudinal axis LA, the attitude of the flight control surface 50 relative to the vertical can be advantageously adjusted. Preferably the flight control surface 50 has the same attitude throughout, to avoid twisting. The tension rods 34 may be oriented at an angle of 4 degrees to 10 degrees relative to the vertical and more particularly about 6 degrees relative to the vertical.

This arrangement provides the benefit that a simple fixed length tension rod 34 may be used and still have adjustability for displacing the upper distal end of the tension rod 34 transversely closer to or transversely further from the spine 21 as needed for the particular flight control surface 50 under consideration. Furthermore, the hanger assembly 30 may be conveniently spring 133 biased to hold the flight control surface 50 in a static position as needed for maintenance and restoration.

Figure 3:
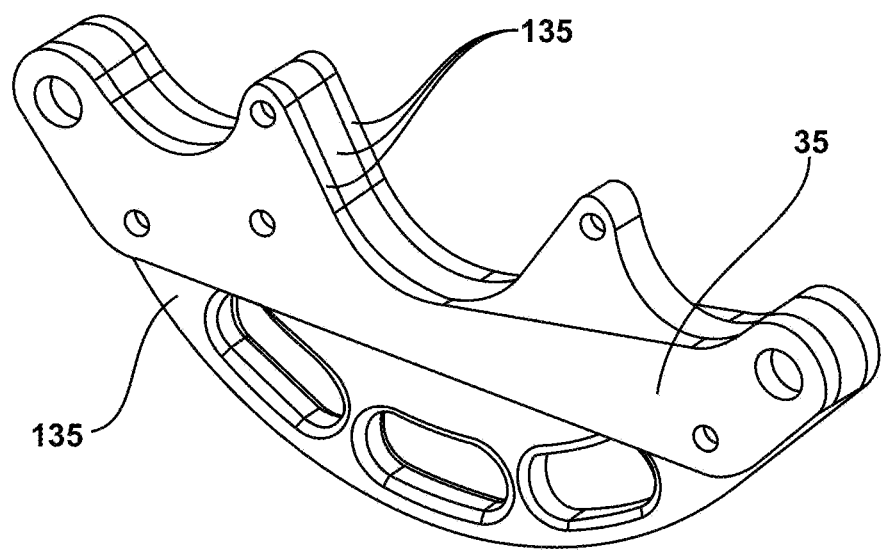
FIG. 3 is a scale perspective view of a cradle according to the present invention.
Figure 4:
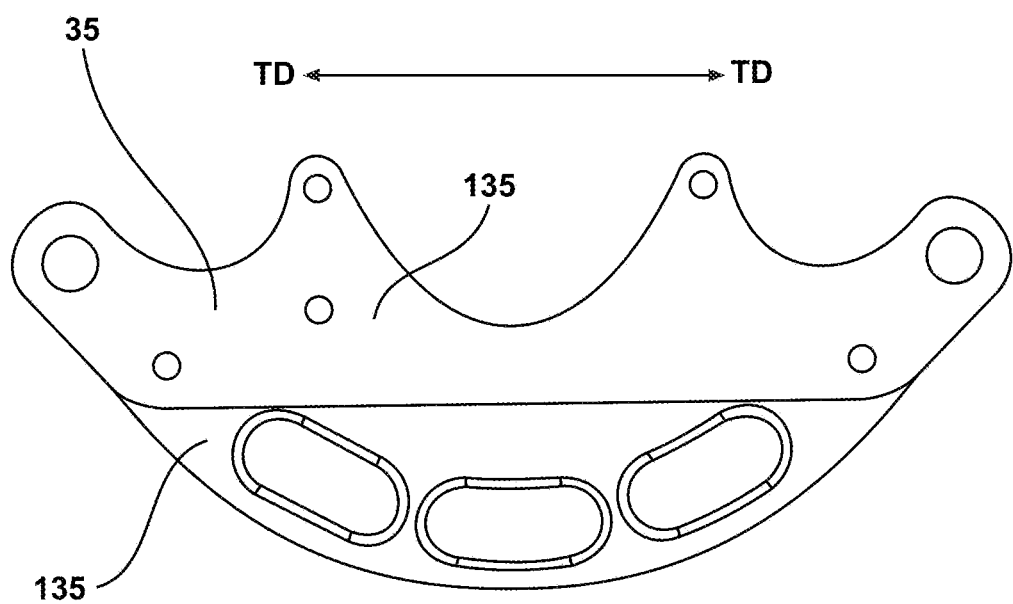
FIG. 4 is a scale frontal view of the cradle of FIG. 3.

Referring to FIG. 3 and FIG. 4, the cradle 35 serves as the mount for flight control surface 50 joints 1 and 2 of the elevator and flight control surface 50 joints 1, 2, 3 and 4 of the rudder. In a preferred modular configuration the invention may utilize different cradles 35, with each cradle 35 being designed for specific joints of the flight control surface 50. The cradle 35 is generally planar and transversely spans the spine 21. The cradle 35 has at least one pivot point disposed on each side of the longitudinal axis LA for attachment of the distal end of a respective tension rod 34 thereto. While a single pivot point for attachment of the tension rod 34 on each side of the spine 21 is shown, one of skill will recognize that the invention is not so limited. The cradle 35 may provide plural pivot points for attachment of the tension rods 34 thereto on each side of the spine 21.

The cradle 35 may be asymmetric about the longitudinal axis LA due to the asymmetric shape of the flight control surface 50. The cradle 35 may have a plurality of attachment holes for fixedly joining the flight control surface 50 thereto. The attachment holes may be blind holes or are preferably through holes.

The cradle 35 may comprise a plurality of plates 135 joined in face to face relationship, particularly three plates 135, in order to accommodate the flight control surface 50 joints having two hinge points. The central plate 135 may have a greater thickness than the outboard plates 135. This configuration provides the benefit that the cradle 35 can be customized to support specific positions on the flight control surface 50. The plates 135 may be made of 0.375 inch stock, cut by waterjet and temporarily or permanently bolted together in the desired configuration.

Figure 5:
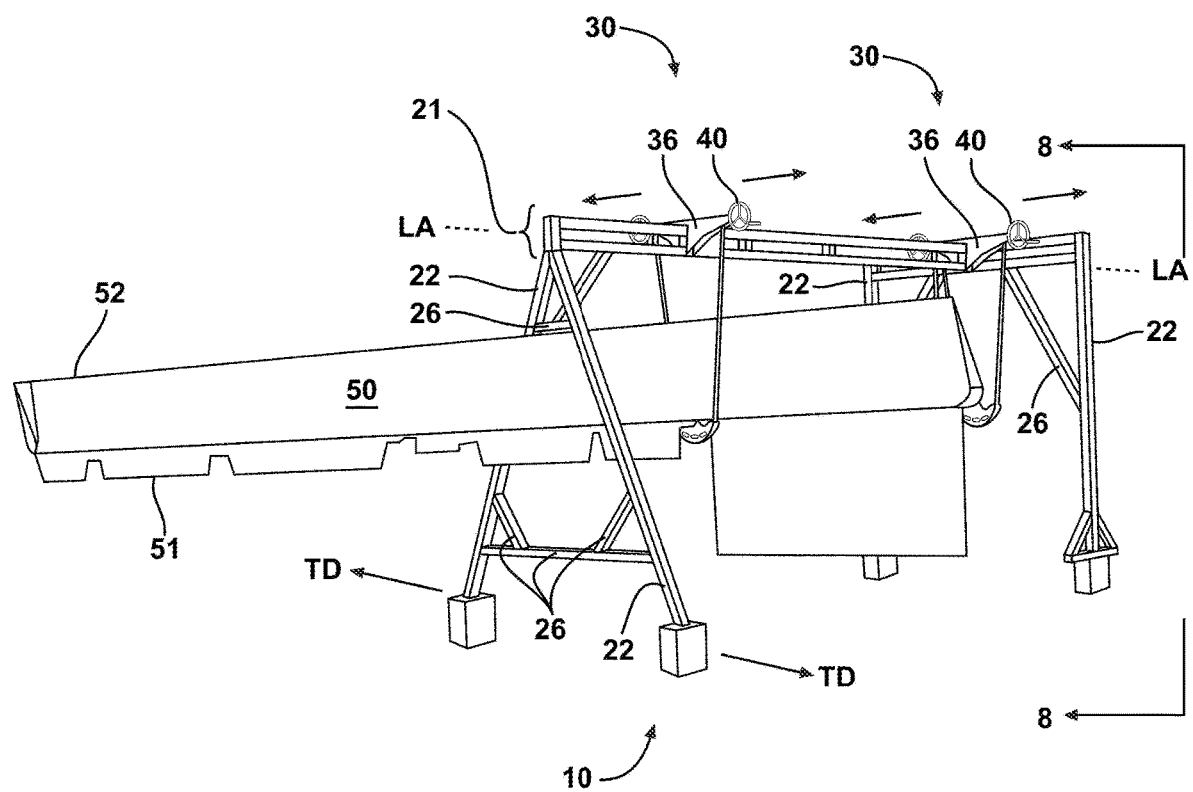
FIG. 5 is a scale perspective view of an alternative embodiment of a stand according to the present invention according to the present invention and holding a flight control surface in position.

Referring to FIG. 5, in an alternative embodiment the hanger assembly 30 may comprise a spreader bar 36 and jack screws 37. The spreader bar 36 may be generally parallel to the transverse direction TD. The spreader bar 36 may be fixedly joined to the spine 21 for stability or movably joined to the spine 21 for customization. The spreader bar 36 and spine 21 may be generally coplanar so that the spreader bar 36 can be straight and disposed the same elevation above the floor and the spine 21.

Figure 6:
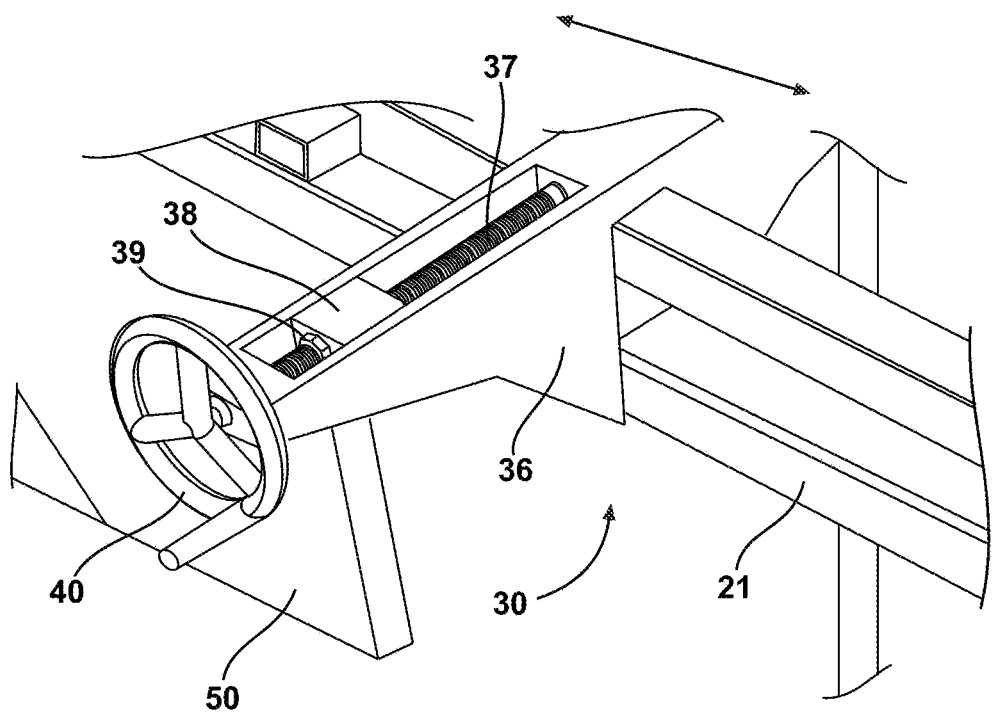
FIG. 6 is a scale fragmentary profile view of the embodiment of FIG. 5.
Figure 7:
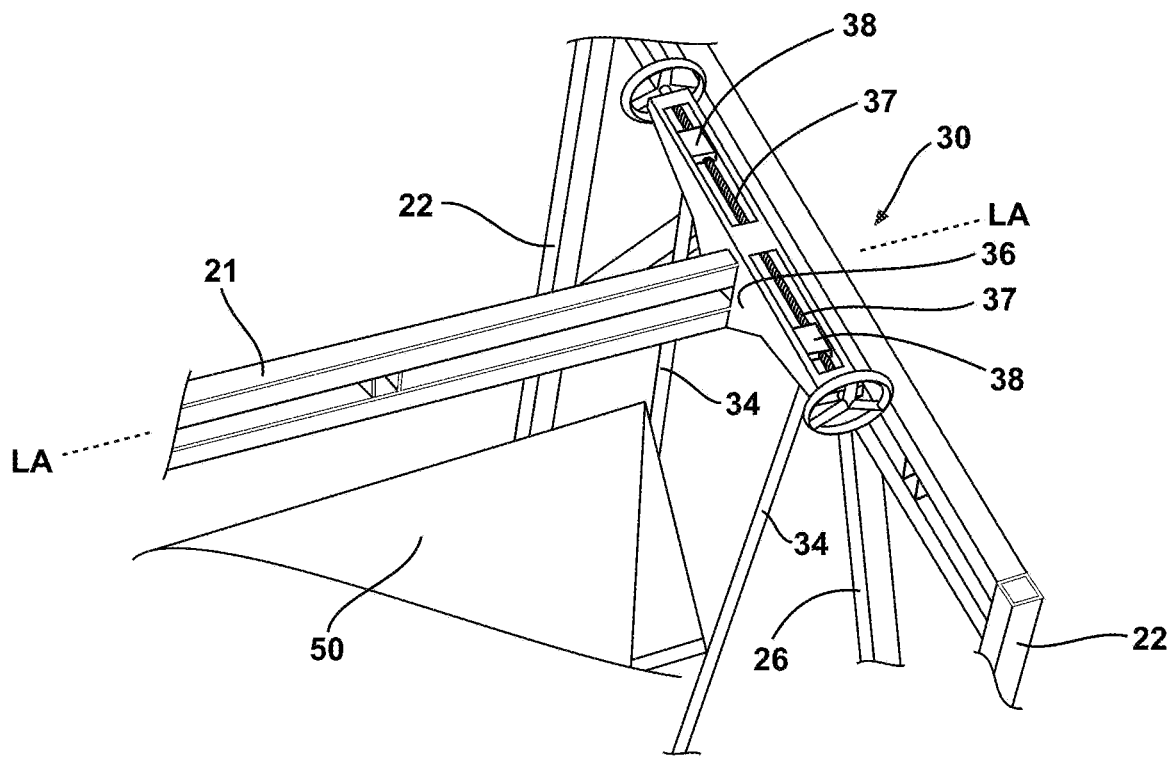
FIG. 7 is a scale, enlarged fragmentary perspective view of the embodiment of FIG. 5.

Referring to FIG. 6 and FIG. 7, the spreader bar 36 supports and optionally confines two symmetrically opposed rotatable jack screws 37, with one jack screw 37 being disposed on each side of the spine 21. The jack screws 37 can be independently operated for customization and may have a hand wheel 40 for ergonomics. Each jack screw 37 has a nonrotatable jack nut 38 threadably disposed thereon. The jack screw 37 moves in the transverse direction TD in responsive to rotation of the jack screw.

One of the aforementioned tension rods 34 depends from each of the jack nuts 38. As with the previous embodiment, the tension rods 34 may be angled relative to the vertical as needed for the particular task under consideration. An upper end of each tension rod 34 is articulably joined to the respective jack screw.

Figure 8:
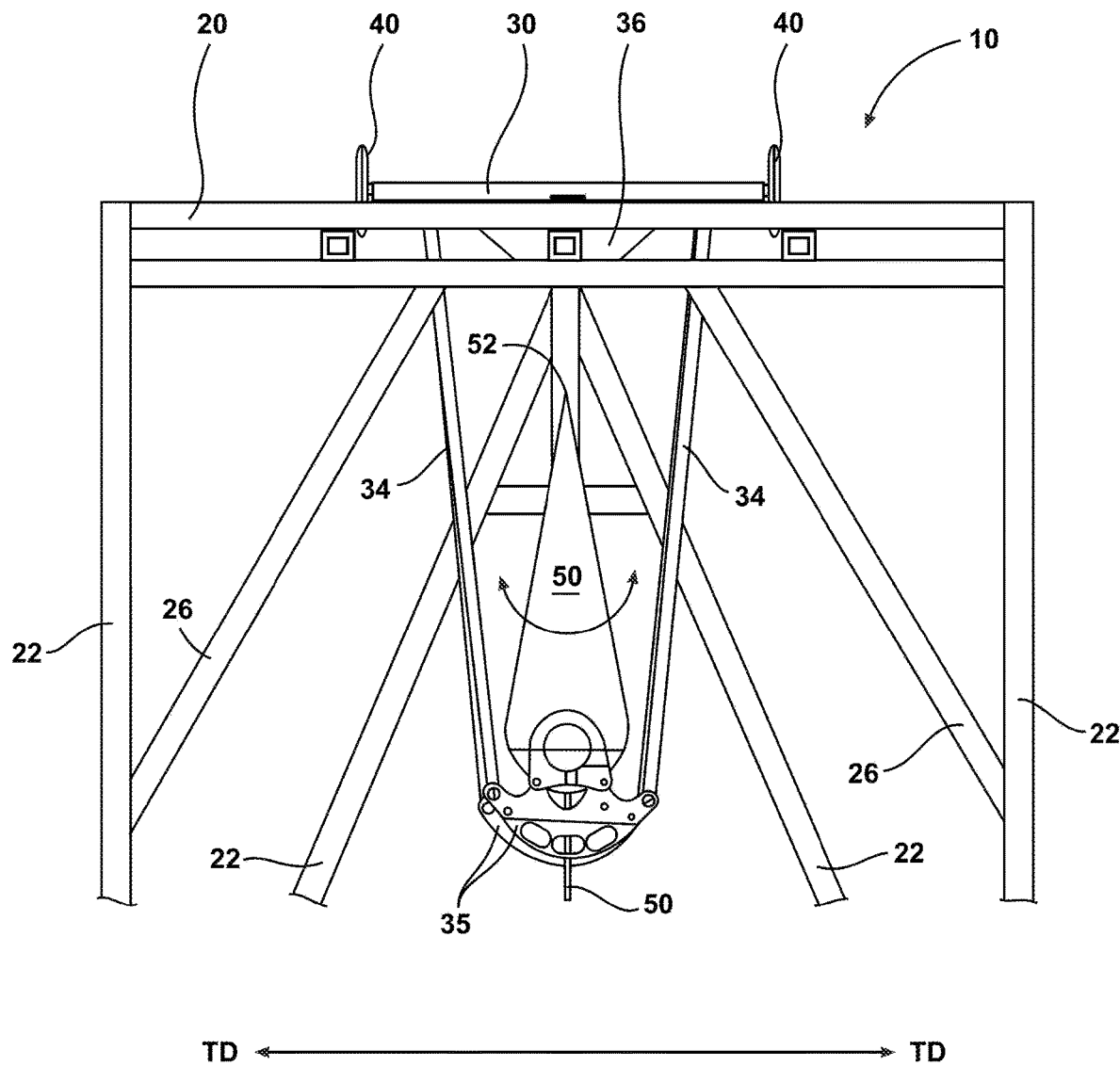
FIG. 8 is a scale, instantaneous fragmentary profile view of the embodiment of FIG. 5 viewed in the direction of arrows 8-8.

Referring to FIG. 8, the lower end of the tension rod 34 is articulably joined to the cradle 35 as described above. The tension rods 34 may be symmetrically or asymmetrically oriented relative to the spine 21. As the jack screws 37 are rotated, the jack nut 38 is drawn towards or away from the spine 21. As viewed in this figure, as the jack nut 38 on the right-hand jack screw 37 is transversely displaced away from the spine 21, the trailing edge 52 of the flight control surface 50 will rotate in the counterclockwise direction. As viewed in this figure, as the jack nut 38 on the right-hand jack screw 37 is transversely displaced towards from the spine 21, the trailing edge 52 of the flight control surface 50 will rotate in the clockwise direction. It will be apparent to one of skill that transverse displacement of the jack nut 38 on the left hand side of the figure produces the opposite effect.

This embodiment provides the benefit that small angular adjustments about the longitudinal axis LA may be conveniently made by small rotations of the jack screw 37 through the hand wheel 40. And the jack screws 37 may be conveniently locked in position using a jam nuts 39.

Each of articulable connections and pivot points described herein may be accommodated using bolts, rivets and/or pins as is known in the art. The articulable connections and pivot points may have bushings and/or lubrication as is known in the art.

In use, the cradles 35 are disconnected from the hanger assembly 30, then bolted onto the open hinges on the rudder or elevator of the flight control surface 50. The flight control surface 50 is then inverted so that the trailing edge 52 faces upward while optionally resting on the shop dollies/carts. At least two mechanics will lift the widest end of the flight control surface 50 and articulably join the cradle 35 to the tension rods 34 while lifting the middle and far end with jacks/lifts to support the flight control surface 50. Once one cradle 35 is mounted, the mechanics will move down the length of the flight control surface 50 to connect the rest of the flight control surface 50 to another hanger assembly 30. As the jacks/lifts holding the flight control surface 50 are lowered, the tension rods 34 and adjustment arms sink downwardly, transferring the weight of the flight control surface 50 to the cradles 35.

The mechanics may then use the pivot arm 32 to adjust the tilt of the flight control surface 50 and to increase the amount of force holding the tension rods 34 in place, tightening the control arms 33 to yield a static structure. All dollies, jacks and lifts are to be lowered and moved out of the immediate area. The entire assembly can now be transported throughout facility for maintenance and restoration. Optional covers may be removably attached to the any of the foregoing components of the stand 10 to prevent overspray from collecting thereon. Dismounting the asset from the stand 10 reverses the preceding steps.

The stand 10 according to the present invention preferably provides for the center of gravity of the flight control surface 50 to be intermediate two hangers. However, if the center of gravity of the flight control surface 50 is not intermediate the two hanger assemblies, as preferred, one hanger assembly 30 will be in compression and the other hanger assembly 30 will be in tension, and yet, without more, all functionality unexpectedly and advantageously is maintained.

The prior art system often led to unfavorable orientations, including the flight control surface 50 being nearly parallel to the ground where, for example, even basic paint stripping becomes difficult. The stand 10 of the present invention provides the benefit, not found in the prior art, that when the trailing edge 52 faces upwards, the flight control surface 50 is in a more nearly vertical plane, readily allowing paint stripping and unexpectedly minimizing corrosive chemical penetration into the gaps at the leading edge 51, thereby reducing further maintenance. Furthermore, the stand 10 of the present invention provides for convenient repainting of the flight control surface 50 after paint stripping is complete. While the stand 10 has been described herein as suitable for a B-52 flight control surface 50, one of skill will recognize the invention is not so limited and may be used with the flight control surface 50 of other aircraft.

All values disclosed herein are not strictly limited to the exact numerical values recited. Unless otherwise specified, each such dimension is intended to mean both the recited value and a functionally equivalent range surrounding that value. For example, a dimension disclosed as "40 mm" is intended to mean "about 40 mm." Every document cited herein, including any cross referenced or related patent or application, is hereby incorporated herein by reference in its entirety unless expressly excluded or otherwise limited. The citation of any document or commercially available component is not an admission that such document or component is prior art with respect to any invention disclosed or claimed herein or that alone, or in any combination with any other document or component, teaches, suggests or discloses any such invention. Further, to the extent that any meaning or definition of a term in this document conflicts with any meaning or definition of the same term in a document incorporated by reference, the meaning or definition assigned to that term in this document shall govern. All limits shown herein as defining a range may be used with any other limit defining a range of that same parameter. That is the upper limit of one range may be used with the lower limit of another range for the same parameter, and vice versa. As used herein, when two components are joined or connected the components may be interchangeably contiguously joined together or connected with an intervening element therebetween. A component joined to the distal end of another component may be juxtaposed with or joined at the distal end thereof. While particular embodiments of the present invention have been illustrated and described, it would be obvious to those skilled in the art that various other changes and modifications can be made without departing from the spirit and scope of the invention and that various embodiments described herein may be used in any combination or combinations. It is therefore intended the appended claims cover all such changes and modifications that are within the scope of this invention.

What is claimed is:

1. A stand holding a flight control surface of an aircraft wing in a static position, the stand having a longitudinal axis and a transverse direction perpendicular thereto, the stand comprising:
   a frame comprising a longitudinally oriented spine disposed above a floor by a plurality of spaced apart uprights a distance sufficient to perform restoration and maintenance on a flight control surface; and
   at least two longitudinally spaced hanger assemblies joined to the longitudinally oriented spine, each hanger assembly comprising
   a transversely oriented cradle statically holding a flight control surface of an aircraft upwardly therefrom, the transversely oriented cradle being articulaby joined to respective distal ends of first and second mutually opposed rods, the mutually opposed rods being articulably connected to and depending downwardly from respective first and second proximal ends connected to the spine, each of the first and second mutually opposed rods being adjustable transversely towards and transversely away from the spine thereby affect an orientation of the flight control surface.

2. A stand according to claim 1 wherein the flight control surface is a B-52 flight control surface and disposed with a trailing edge above a leading edge.

3. A stand according to claim 2 wherein the respective proximal ends of the first and second mutually opposed rods can be locked in position relative to the respective transverse spacing from the longitudinal axis.

4. A stand according to claim 2 wherein the proximal end of each of the first and second mutually opposed rods is adjustable transversely towards and transversely away from the spine independent of the proximal end of the other mutually opposed rod to thereby affect the orientation of the B-52 flight control surface.

5. A stand according to claim 4 wherein the proximal end of the first respective mutually opposed rod is disposed a first different transverse distance from the longitudinal axis and the proximal end of the second respective mutually opposed rod is disposed a second different transverse distance from the longitudinal axis, the first transverse distance and the second transverse distance being mutually unequal.

6. A stand according to claim 2 wherein the respective proximal ends of the first and second mutually opposed rods are disposed above the spine.

7. A stand according to claim 6 wherein the distal ends of the first and second mutually opposed rods are joined to the cradle at an elevation blow the leading edge of the flight control surface.

8. A stand according to claim 7 wherein the at least two hanger assemblies are mutually identical.

9. A stand according to claim 7 wherein each of the first and second mutually opposed rods is oriented at an angle from 4 degrees to 10 degrees from vertical.

10. A stand according to claim 9 wherein each of the first and second mutually opposed rods is nonidentically oriented from 4 degrees to 10 degrees from vertical.

11. A stand for holding a flight control surface of an aircraft wing, the stand having a longitudinal axis and a transverse direction perpendicular thereto, the stand comprising:
    a frame comprising at least three spaced apart uprights held in fixed relationship and a longitudinally oriented spine connecting at least two spaced apart uprights; and
    at least two longitudinally spaced hanger assemblies joined to the longitudinally oriented spine, each hanger assembly comprising
    a stanchion upstanding from the spine and extending transversely outwardly of the longitudinal axis,
    two mutually opposed articulable pivot arms, with a pivot arm being disposed on each side of the longitudinal axis, each pivot arm extending transversely outwardly from a respective proximal end articulably joined to the stanchion to a respective distal end transversely spaced therefrom,
    two mutually opposed control arms with a control arm being disposed on each side of the longitudinal axis, each control arm extending upwardly from the two respective pivot arms to be fixedly joined to the stanchion above the respective proximal ends of the pivot arms,
    two mutually opposed rods, with a rod being disposed on each side of the longitudinal axis, each rod depending downwardly from an upper end joined to the respective pivot arm 32 to a respective lower ends therebelow, and
    a transversely oriented cradle associated with and articulaby joined to the respective lower ends of the two mutually opposed rods, the cradle being configured to hold a flight control surface of an aircraft.

12. A stand according to claim 11 wherein the stanchion of each hanger assembly extends transversely outwardly of the longitudinal axis so that the control arms and the pivot arms attached are articulably attached thereto symmetrically outboard of the longitudinal axis.

13. A stand according to claim 12 wherein the cradle comprises a plurality of plates joined together in face to face relationship to provide differential thicknesses.

14. A stand according to claim 12 wherein the control arms are articulably attached to the stanchion and the pivot arms are articulably attached to the stanchion below the control arms.

15. A stand according to claim 14 wherein the cradle of each hanger assembly comprises two outboard hinge points for articulable attachment of the rods thereto and a plurality of attachment points for joining the flight control surface to the cradle, each of the plurality of attachment points being transversely inboard of the two outboard hinge points.

16. A stand for holding a flight control surface of an aircraft wing, the stand having a longitudinal axis and a transverse direction perpendicular thereto, the stand comprising:
   a frame comprising a longitudinally oriented spine and at least three spaced apart uprights held in fixed relationship thereto; and
   at least two longitudinally spaced hanger assemblies joined to the longitudinally oriented spine, each hanger assembly comprising
   a transversely oriented spreader bar extending outwardly from the spine in mutually opposed transverse directions, the spreader bar supporting first and second rotatable jack screws on each side of the spine, each of the first and second jack screws having a respective first or second nonrotatable transversely displaceable jack nut threadably associated therewith,
   first and second mutually opposed rods articulably joined to the respective first or second jack nut at a proximal end and depending downwardly therefrom to a respective distal end below the proximal end of the respective first or second rod, and
   a transversely oriented cradle associated with and articulably joined to the distal ends of the first and second mutually opposed rods, the cradle being adapted to fixedly hold a flight control surface of an aircraft.

17. A stand according to claim 16 wherein the first and second jack screws are mutually colinear.

18. A stand according to claim 17 wherein the first and second nonrotatable transversely displaceable jack nuts are captured by the spreader bar to prevent rotation thereof.

19. A stand according to claim 17 wherein the spreader bar and the spine are generally coplanar.

20. A stand according to claim 19 fixedly holding a B-52 flight control surface, wherein a center of gravity of the B-52 flight control surface is longitudinally outboard of the uprights of the frame.

* * * * *